United States Patent
Yamaguchi et al.

(10) Patent No.: US 8,878,553 B2
(45) Date of Patent: Nov. 4, 2014

(54) DEVICE FOR MEASURING DISTANCE BETWEEN HEADREST AND HEAD, METHOD FOR MEASURING DISTANCE BETWEEN HEADREST AND HEAD, HEADREST POSITION ADJUSTING DEVICE, AND HEADREST POSITION ADJUSTING METHOD

(75) Inventors: Yuichiro Yamaguchi, Sakura (JP); Takuya Osaki, Sakura (JP); Yuki Noguchi, Sakura (JP)

(73) Assignee: Fujikura Ltd., Tokyo (JP)

( * ) Notice: Subject to any disclaimer, the term of this patent is extended or adjusted under 35 U.S.C. 154(b) by 209 days.

(21) Appl. No.: 13/260,057

(22) PCT Filed: Mar. 24, 2010

(86) PCT No.: PCT/JP2010/055068
§ 371 (c)(1),
(2), (4) Date: Oct. 18, 2011

(87) PCT Pub. No.: WO2010/110307
PCT Pub. Date: Sep. 30, 2010

(65) Prior Publication Data
US 2012/0032691 A1    Feb. 9, 2012

(30) Foreign Application Priority Data
Mar. 24, 2009   (JP) ................. 2009-072039

(51) Int. Cl.
*G01R 27/26* (2006.01)
(Continued)

(52) U.S. Cl.
CPC *B60N 2/002* (2013.01); *G01B 7/28* (2013.01); *B60N 2/4864* (2013.01);
(Continued)

(58) Field of Classification Search
USPC .............. 324/662, 671; 340/870.37; 280/735; 180/273; 297/216.2; 382/103
See application file for complete search history.

(56) References Cited

U.S. PATENT DOCUMENTS 5,848,661 A * 12/1998 Fu .................................. 180/273
5,871,232 A *  2/1999 White ........................... 280/735
(Continued)

FOREIGN PATENT DOCUMENTS

CN          101074004 A  * 11/2007
DE      102008051020 B3     9/2009
(Continued)

OTHER PUBLICATIONS

International Search Report of PCT/JP2010/055068, mailing date May 18, 2010.
(Continued)

Primary Examiner — Patrick Assouad
Assistant Examiner — Sean Curtis
(74) Attorney, Agent, or Firm — Westerman, Hattori, Daniels & Adrian, LLP

(57) ABSTRACT

A headrest position adjusting device 100 includes a distance measuring device 10 and a drive motor unit 30. The distance measuring device 10 includes a plurality of sensing electrodes 11 to 15 and a detecting circuit 20. The detecting circuit 20 includes a plurality of capacitance sensing circuits 21 to 25 connected one-to-one to the sensing electrodes 11 to 15, and an arithmetic processing circuit 28. The drive motor unit 30 includes a motor driving circuit and a drive motor. Based on the detected capacitance values, the detecting circuit 20 calculates a difference value between a capacitance value of the sensing electrode which shows the largest capacitance value and the capacitance value of the sensing electrode which shows the lowest capacitance value, and thereby measures an electrode-head distance L. A position adjusting operation for a headrest 43 is performed based on the measurement result.

20 Claims, 12 Drawing Sheets

(51) Int. Cl.
  *G01B 7/28* (2006.01)
  *B60N 2/48* (2006.01)
  *B60N 2/02* (2006.01)
  *B60N 2/00* (2006.01)
  *G01B 7/02* (2006.01)

(52) U.S. Cl.
  CPC .......... *B60N 2/4867* (2013.01); *B60N 2/0244* (2013.01); *G01B 7/023* (2013.01); *B60N 2/4805* (2013.01)
  USPC ...... 324/662; 324/671; 340/870.37; 280/735; 180/273; 297/216.2; 382/103

(56) References Cited

U.S. PATENT DOCUMENTS

| | | | | |
|---|---|---|---|---|
| 6,042,145 | A * | 3/2000 | Mitschelen et al. | 280/735 |
| 6,402,195 | B1 | 6/2002 | Eisenmann et al. | |
| 7,448,677 | B2 * | 11/2008 | Sakai et al. | 297/216.12 |
| 2005/0253712 | A1 | 11/2005 | Kimura et al. | |
| 2007/0267909 | A1 * | 11/2007 | Truckenbrodt et al. | 297/410 |

FOREIGN PATENT DOCUMENTS

| | | |
|---|---|---|
| DE | 102008043806 A1 | 1/2010 |
| DE | 102008064348 B3 | 4/2010 |
| EP | 1857318 A2 | 11/2007 |
| JP | 64-011512 A | 1/1989 |
| JP | 1-285801 A | 11/1989 |
| JP | 2000-075044 A | 3/2000 |
| JP | 2000-309242 A | 11/2000 |
| JP | 2002-221579 A | 8/2002 |
| JP | 2007-131026 A | 5/2007 |
| JP | 2007-137219 A | 6/2007 |
| JP | 2007-280352 A | 10/2007 |
| WO | 2008/133291 A1 | 11/2008 |
| WO | 2009/028532 A1 | 3/2009 |

OTHER PUBLICATIONS

Extended European Search Report dated Aug. 7, 2014, issued in corresponding European Patent Application No. 10756103.7 (6 pages).

* cited by examiner

DEVICE FOR MEASURING DISTANCE BETWEEN HEADREST AND HEAD, METHOD FOR MEASURING DISTANCE BETWEEN HEADREST AND HEAD, HEADREST POSITION ADJUSTING DEVICE, AND HEADREST POSITION ADJUSTING METHOD

TECHNICAL FIELD

The present invention relates to a device for measuring the distance between a headrest and a head for measuring and utilizing the distance between a headrest provided on a seat of a vehicle such as an automobile and a head, a method for measuring the distance between a headrest and a head, a headrest position adjusting device, and a headrest position adjusting method.

BACKGROUND ART

Conventionally, a vehicle headrest device (for example, see Patent Document 1 (pp. 6-8, and FIGS. 1-4)) is known as a technique for adjusting the position of a headrest provided on a seat of a vehicle such as an automobile, etc. When this vehicle headrest device moves the front portion of the headrest in a direction to be fully opened, an ECU of the device judges based on a detection result of a capacitance sensor that the front portion of the headrest has come close to the head of a vehicle occupant and stops the front portion of the headrest.

The ECU judges that the front portion of the headrest has come close to the head of the vehicle occupant based on an absolute capacitance change from a reference capacitance value of the capacitance sensor or based on an amount of change of the capacitance value.

A vehicle occupant protecting device (for example, see Patent Document 2 (pp. 3-6, and FIGS. 1-5)) is a technique for moving a headrest, which is movable forward with respect to the vehicle, to a pre-crash phase before an object crashes into the vehicle from behind. This device controls the amount to move the headrest frontward based on how a capacitance sensed by a capacitance sensor changes.

A vehicle occupant sensing system (for example, see Patent Document 3 (pp. 3-5, and FIGS. 1-4)) generates a weak electric field around a plurality of strip-shaped antenna electrodes which are provided in a horizontal state in a backrest (or a seat back) of a seat with a gap provided therebetween in the vertical direction. The system detects a current flowing through the antenna electrodes based on the weak electric field.

Then, the system extracts the shoulder line of the vehicle occupant sitting on the seat based on the detected current, senses the position of the head based on the shoulder line, and sends data based on the sensing result to an air bag device. In this way, the system sets the air bag of the air bag device to a deployable or non-deployable state.

CONVENTIONAL ART DOCUMENTS

Patent Documents

Patent Document 1: JP No. 4018112
Patent Document 2: JP2007-131026A
Patent Document 3: JP No. 3347069

DISCLOSURE OF INVENTION

Problem to be Solved by the Invention

However, the vehicle headrest device disclosed in Patent Document 1 identified above and the vehicle occupant protecting device disclosed in Patent Document 2 identified above have to move the headrest constantly in order to determine the distance between the head of the vehicle occupant and the headrest. Moreover, if the head of the vehicle occupant moves while the headrest is operating, the device might detect a false amount of movement. This takes unnecessary power consumption, generates an error in a calculation result, and makes it difficult to move the headrest with a correct distance determination.

Furthermore, since the vehicle occupant sensing system disclosed in Patent Document 3 identified above is a system for sensing the physical constitution of the vehicle occupant, it cannot be applied to, for example, a system for maintaining the distance between the headrest and the head of the vehicle occupant.

To solve the problems of the conventional techniques described above, an object of the present invention is to provide a device for measuring the distance between a headrest and a head, a method for measuring the distance between a headrest and a head, a headrest position adjusting device, and a headrest position adjusting method which are, with a simple configuration, capable of measuring the distance between a headrest and a head and automatically adjusting the position of the headrest accurately by, in particular, preventing an unnecessary movement of the headrest.

Means for Solving the Problem

To solve the problems described above and achieve the object, a device for measuring a distance between a headrest and a head according to the present invention includes: a plurality of sensing electrodes which are provided in a headrest provided on a seat of a vehicle for sensing capacitances between a head of a human body sitting on the seat and the headrest, the sensing electrodes being provided side by side along a height direction of the headrest; a detecting circuit which detects capacitance values which are based on the capacitances from the plurality of sensing electrodes; and distance measuring means which measures an electrode-head distance indicating a distance between the headrest and the head, in accordance with detection results detected by the detecting circuit, wherein the distance measuring means calculates a difference value between the capacitance value of the sensing electrode from which a largest capacitance value is detected by the detecting, circuit among the plurality of sensing electrodes and the capacitance value of the sensing electrode from which a smallest capacitance value is detected by the detecting circuit among the plurality of sensing electrodes, and measures the electrode-head distance based on the difference value.

For example, the distance measuring means may measure the electrode-head distance by comparing the difference value with preset data which profiles a relationship between distance and difference value.

For example, the plurality of sensing electrodes may be provided in the headrest at a portion closer to a front surface of the headrest and formed in a rectangular strip shape having its longer dimension extend in a width direction perpendicular to the height direction, and the detecting circuit may include a plurality of capacitance sensing circuits which are connected one-to-one to the plurality of sensing electrodes, and output the capacitance values which are based on the capacitances sensed by the sensing electrodes.

For example, the plurality of sensing electrodes may be provided in the headrest at a portion closer to a front surface of the headrest and formed in a rectangular strip shape having its longer dimension extend in a width direction perpendicular to the height direction, and the detecting circuit may include a switching circuit connected to the plurality of sensing electrodes, and a capacitance sensing circuit which outputs the capacitance value which is based on the capacitance sensed by any of the sensing electrodes which are to be connected to the capacitance sensing circuit intertemporally through the switching circuit.

A headrest position adjusting device according to the present invention includes: the device for measuring a distance between a headrest and a head according to any of the inventions described above; and position adjusting means which adjusts a position of the headrest to an appropriate position for the head based on a measurement result from the device for measuring a distance.

For example, the position adjusting means may adjust the position of the headrest by moving the headrest in a frontward direction or rearward direction of the vehicle based on the difference value which is included in the measurement result, such that the difference value becomes a predetermined value.

For example, the position adjusting means may compare the difference value included in the measurement result with a predetermined threshold, and when the difference value is smaller than the predetermined threshold, may stop a position adjusting operation for the headrest at least in the height direction.

For example, when the position adjusting means stops the position adjusting operation for the headrest for a predetermined time, after the predetermined time passes, the position adjusting means may again compare the difference value with the predetermined threshold.

For example, when the difference value included in the measurement result is smaller than a predetermined threshold, the position adjusting means may adjust the position of the headrest by moving the headrest in an upward direction or downward direction of the vehicle by using the capacitance values which are detected by the detecting circuit based on the capacitances from at least the sensing electrode located at a highest position of the headrest among the plurality of sensing electrodes and the sensing electrode located at a lowest position of the headrest among the plurality of sensing electrodes.

For example, when the difference value included in the measurement result is equal to or larger than a predetermined threshold, the position adjusting means may calculate an appropriate position of the head with respect to the headrest by using the capacitance values which are detected by the detecting circuit based on the capacitances from the plurality of sensing electrodes, and may adjust the position of the headrest to the appropriate position.

A method for measuring a distance between a headrest and a head according to the present invention includes: a sensing step of sensing capacitances between a head of a human body sitting on a seat of a vehicle and a headrest provided on the seat by means of a plurality of sensing electrodes which are provided in the headrest side by side along a height direction of the headrest; a detecting step of detecting capacitance values which are based on the capacitances sensed in the sensing step; and a distance measuring step of measuring an electrode-head distance indicating a distance between the headrest and the head, in accordance with detection results detected in the detecting step, wherein the distance measuring step calculates a difference value between the capacitance value of the sensing electrode from which a largest capacitance value is detected in the detecting step among the plurality of sensing electrodes and the capacitance value of the sensing electrode from which a smallest capacitance value is detected in the detecting step among the plurality of sensing electrodes, and measures the electrode-head distance based on the difference value.

For example, the distance measuring step may measure the electrode-head distance by comparing the difference value with preset data which profiles a relationship between distance and difference value.

A headrest position adjusting method according to the present invention includes: the method for measuring a distance between a headrest and a head according to the invention described above; and a position adjusting step of adjusting a position of the headrest to an appropriate position for the head based on a measurement result measured by the method for measuring a distance.

For example, the position adjusting step may adjust the position of the headrest by moving the headrest in a frontward direction or rearward direction of the vehicle based on the difference value which is included in the measurement result, such that the difference value becomes a predetermined value.

For example, the position adjusting step may compare the difference value included in the measurement result with a predetermined threshold, and when the difference value is smaller than the predetermined threshold, may stop a position adjusting operation for the headrest at least in the height direction.

For example, when the position adjusting step stops the position adjusting operation for the headrest for a predetermined time, after the predetermined time passes, the position adjusting step may again compare the difference value with the predetermined threshold.

For example, when the difference value included in the measurement result is smaller than a predetermined threshold, the position adjusting step may adjust the position of the headrest by moving the headrest in an upward direction or downward direction of the vehicle by using the capacitance values which are detected in the detecting step based on the capacitances from at least the sensing electrode located at a highest position of the headrest among the plurality of sensing electrodes and the sensing electrode located at a lowest position of the headrest among the plurality of sensing electrodes.

For example, when the difference value included in the measurement result is equal to or larger than a predetermined threshold, the position adjusting step may calculate an appropriate position of the head with respect to the headrest by using the capacitance values which are detected in the detecting step based on the capacitances from the plurality of sensing electrodes, and may adjust the position of the headrest to the appropriate position.

Effect of the Invention

According to the present invention, it is possible to measure the distance between a headrest and a head with a simple configuration and automatically adjust the position of the headrest accurately by preventing an unnecessary movement of the headrest.

BEST MODE FOR CARRYING OUT THE INVENTION

Preferred embodiments of a device for measuring the distance between a headrest and a head, a method for measuring the distance between a headrest and a head, a headrest position adjusting device, and a headrest position adjusting method according to the present invention will now be explained below with reference to the attached drawings.

Figure 1:
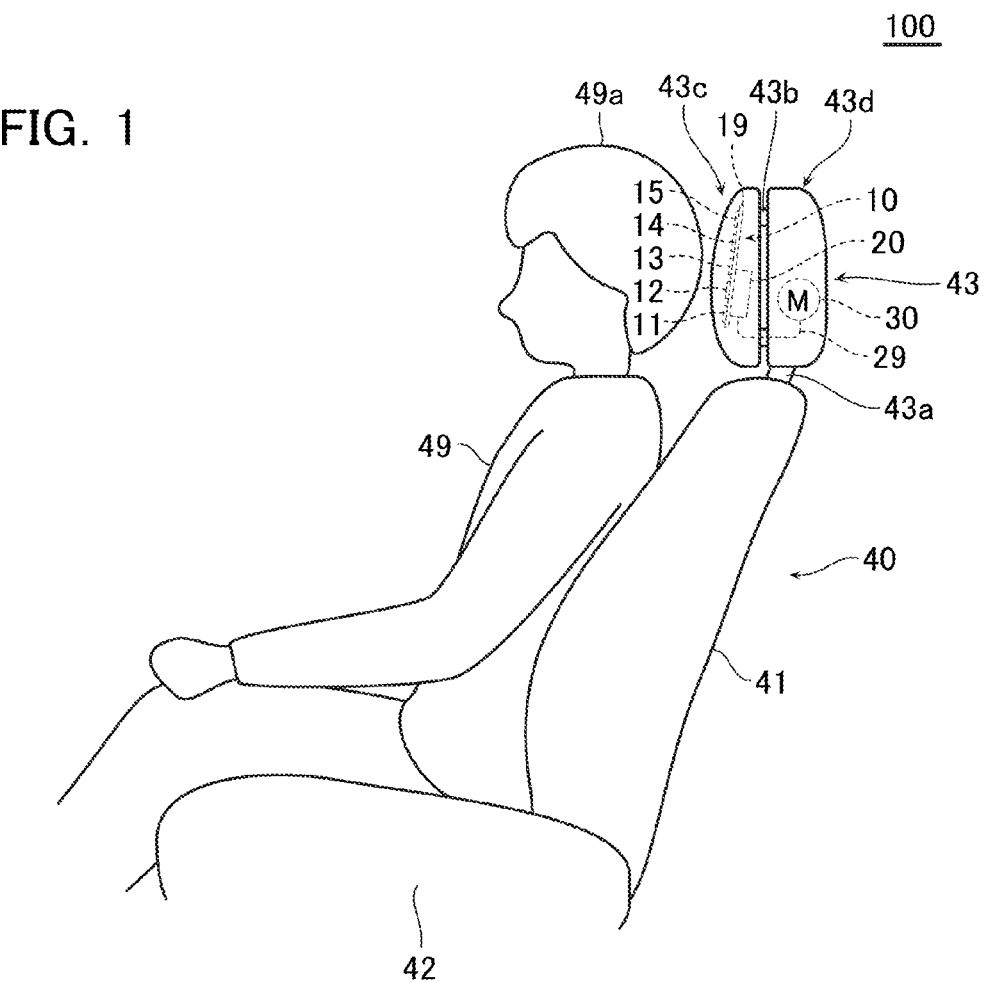
FIG. 1 is a schematic diagram showing an example of a seat of a vehicle mounted with a headrest position adjusting device including a device for measuring the distance between a headrest and a head according to one embodiment of the present invention.
Figure 2:
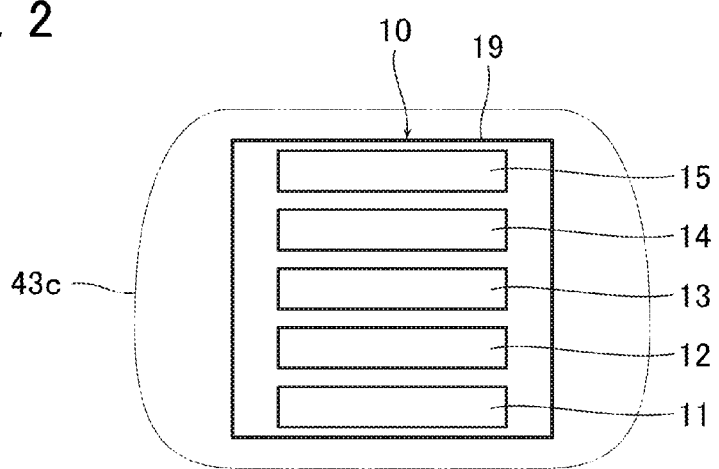
FIG. 2 is an explanatory diagram showing an example of how the device for measuring the distance between the headrest and a head is disposed in the headrest according to one embodiment of the present invention.

FIG. 1 is a schematic diagram showing an example of a seat of a vehicle mounted with a headrest position adjusting device including a device for measuring the distance between a headrest and a head according to one embodiment of the present invention. FIG. 2 is an explanatory diagram showing an example of how the device for measuring the distance between the headrest and a head is disposed in the headrest according to one embodiment of the present invention.

As shown in FIG. 1 and FIG. 2, a headrest position adjusting device 100 is provided in a seat 40 of a vehicle, etc., and includes, for example, a distance measuring device 10 provided in a headrest front portion 43c constituting a part of a headrest 43 of the seat 40, and a drive motor unit 30 provided in a headrest back portion 43d constituting another part of the headrest 43. The distance measuring device 10 and the drive motor unit 30 are electrically connected to each other through, for example, a harness 29.

The headrest front portion 43c is connected to the headrest back portion 43d through a support shaft 43b to be freely movable in the frontward-rearward direction of the vehicle. The headrest back portion 43d is connected to a backrest (a back seat) 41 of the seat 40 through a support shaft 43a to be freely movable in the upward-downward direction (the height direction of the headrest 43) and leftward-rightward direction of the vehicle.

For example, the distance measuring device 10 includes a plurality of sensing electrodes 11 to 15 formed on one surface (front surface) of a substrate 19, and a detecting circuit 20 formed (mounted) on the other surface (back surface) of the substrate 19. The distance measuring device 10 detects capacitance values based on capacitances from the sensing electrodes 11 to 15, detects a head 49a of a human body 49 sitting on a sitting portion 42 of the seat 40, and measures an electrode-head distance indicating the distance between the headrest 43c and the head 49a.

The substrate 19 is made of, for example, a flexible printed board, a rigid substrate, or a rigid flexible substrate. The plurality of sensing electrodes 11 to 15 are made of a conductive material such as copper, a copper alloy, aluminum, etc. which is patterned on the substrate 19 made of an insulating material such as polyethylene terephthalate (PET), polyethylene naphthalate (PEN), polyimide (PI), polyamide (PA), an epoxy resin, etc. Other than this, the plurality of sensing electrodes 11 to 15 may be made of a material such as an electric wire, a conductive film, etc.

The plurality of sensing electrodes 11 to 15 are provided in the headrest front portion 43c at a portion close to the front surface thereof, formed in a rectangular strip shape having its longer dimension extend in the width direction (leftward-rightward direction) of the headrest 43 perpendicular to the height direction of the headrest 43, and arranged side by side with their widths lined up along the height direction of the headrest 43. Electrode numbers 1 to 5 (N1 to N5 or ch1 to ch5) are allocated to the plurality of sensing electrodes 11 to 15 respectively. In the present example, there are provided five electrodes, but it is only necessary to provide such a number of electrodes as are necessary for sensing a capacitance between the head 49a of the human body 49 sitting on the seat 40 and the headrest 43 while the headrest 43 is at rest. For example, it is enough if there are provided two or more electrodes.

As will be described in detail later, the distance measuring device 10 calculates, based on capacitance values detected in a measurement, a difference value between the capacitance value (see FIGS. 7A and 7B; the same applies hereinafter) of the sensing electrode (e.g., the sensing electrode 13) from which the largest capacitance value is detected among the plurality of sensing electrodes 11 to 15 and the capacitance value (see FIGS. 7A and 7B; the same applies hereinafter) of the sensing electrode (e.g., the sensing electrode 11) from which the smallest capacitance value is detected among the plurality of sensing electrodes 11 to 15, and measures an electrode-head distance based on this difference value.

Figure 3:
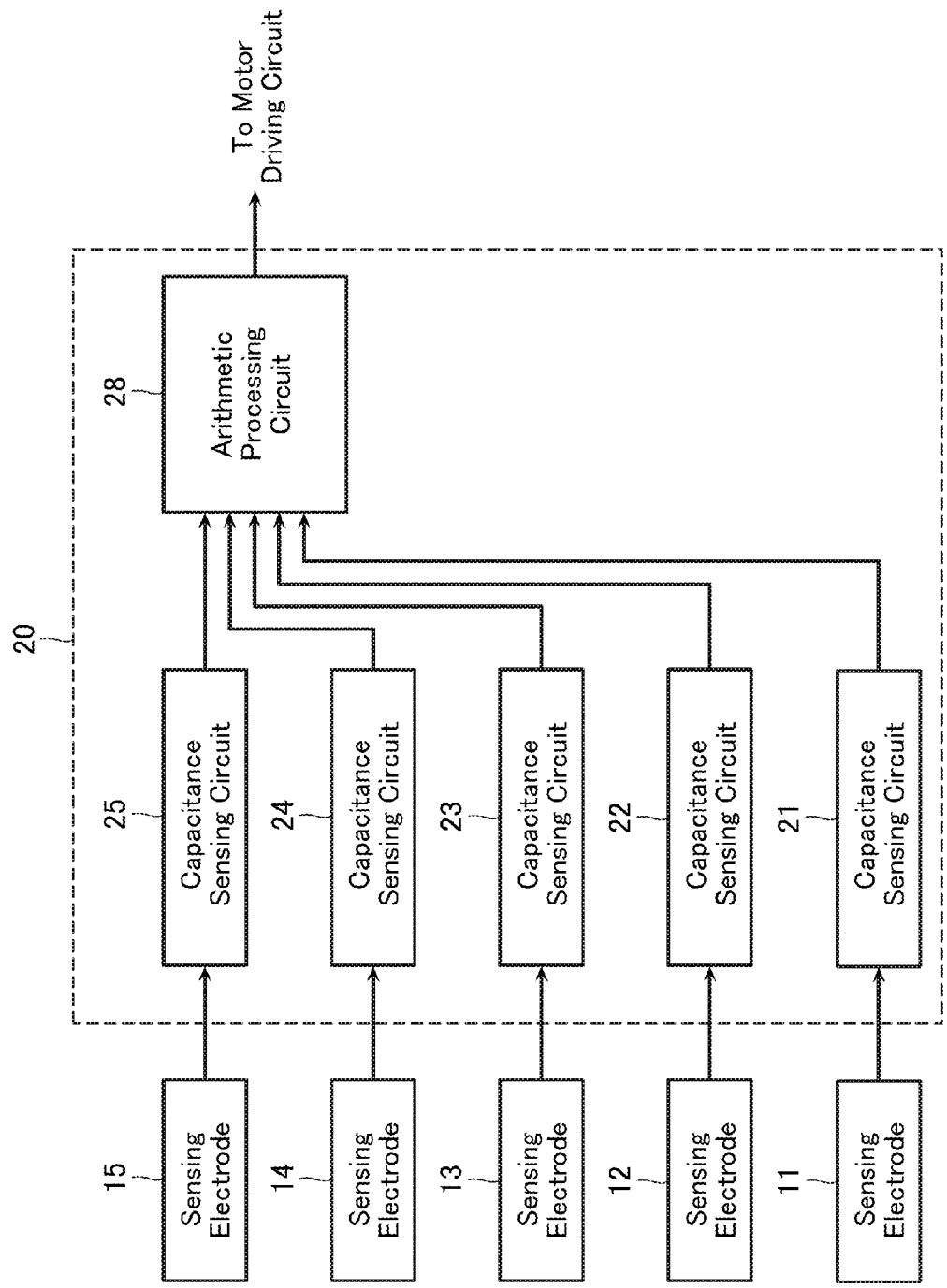
FIG. 3 is a block diagram showing an example of the whole configuration of the distance measuring device.

As shown in FIG. 3, the detecting circuit 20 of the distance measuring device 10 includes a plurality of capacitance sensing circuits 21 to 25 which are connected one-to-one to the sensing electrodes 11 to 15 and output information indicating the capacitances sensed by the sensing electrodes 11 to 15. The detecting circuit 20 also includes an arithmetic processing circuit 28 which is connected to the capacitance sensing circuits 21 to 15, calculates the difference value and the electrode-head distance based on the capacitances indicated by the information output by the capacitance sensing circuits 21 to 25, calculates the height position of the head 49a by comparing the capacitances, and outputs information indicating the calculation results to a motor driving circuit (unillustrated) of the drive motor unit 30.

Figure 4:
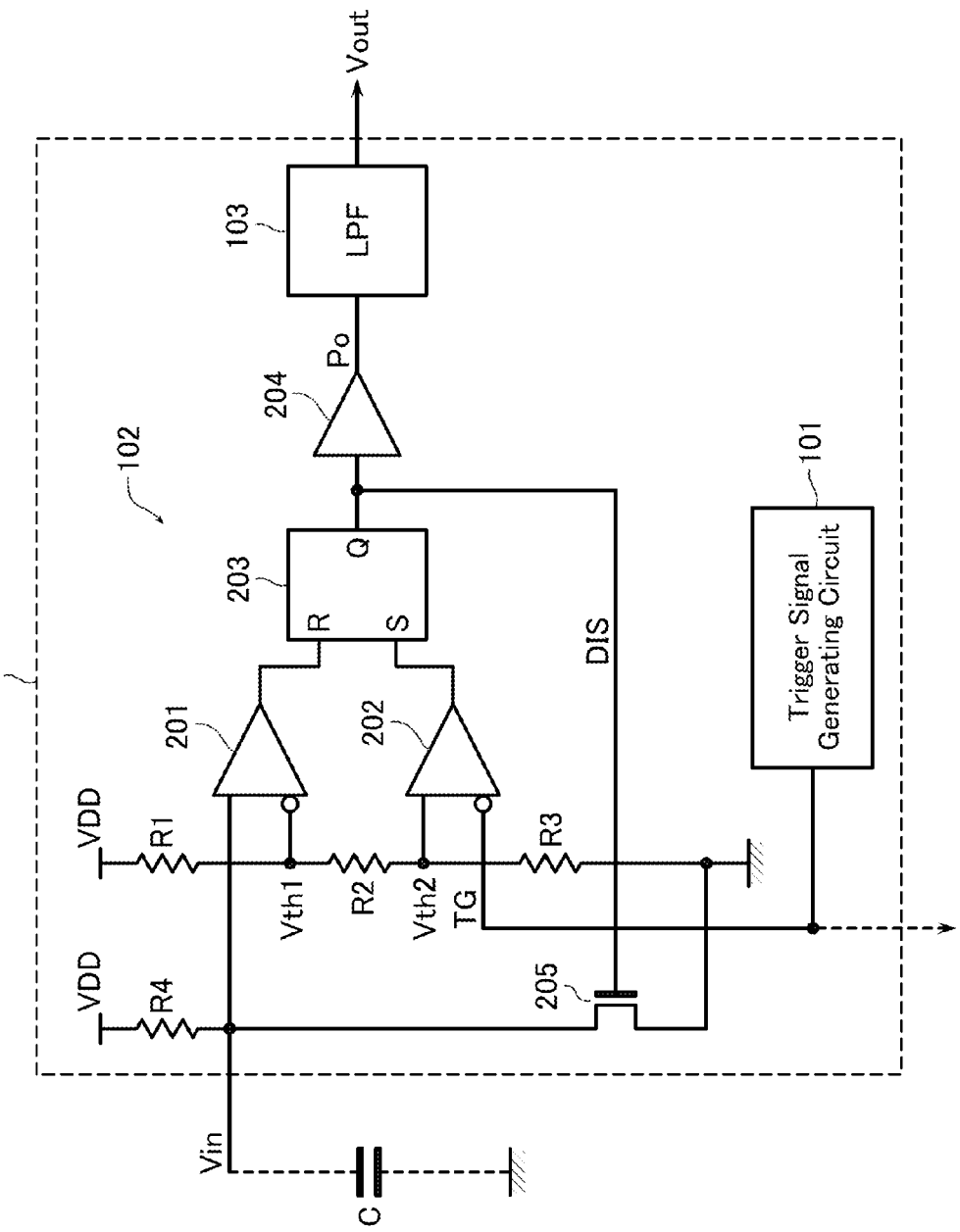
FIG. 4 is a block diagram showing an example of the configuration of a capacitance sensing circuit of the distance measuring device.

Here, as shown in FIG. 4, each capacitance sensing circuit 21 (22 to 25) has a duty ratio which changes in accordance with a capacitance C, and for example, includes a trigger signal generating circuit 101 which outputs a trigger signal TG having a fixed period, a timer circuit 102 which outputs a pulse signal Po having a duty ratio which changes in accordance with the level of the capacitance C connected to an input terminal, and a low-pass filter (LPF) 103 which smoothes the pulse signal Po.

For example, the timer circuit 102 includes two comparators 201 and 202, an RS flip-flop circuit (hereinafter referred to as "RS-FF") 203 which receives the outputs of these comparators 201 and 202 at its reset terminal R and its set terminal S respectively, a buffer 204 which outputs an output DIS of the RS-FF 203 to the LPF 103, and a transistor 205 which is controlled between on and off according to the output DIS of the RS-FF 203.

Figure 5:
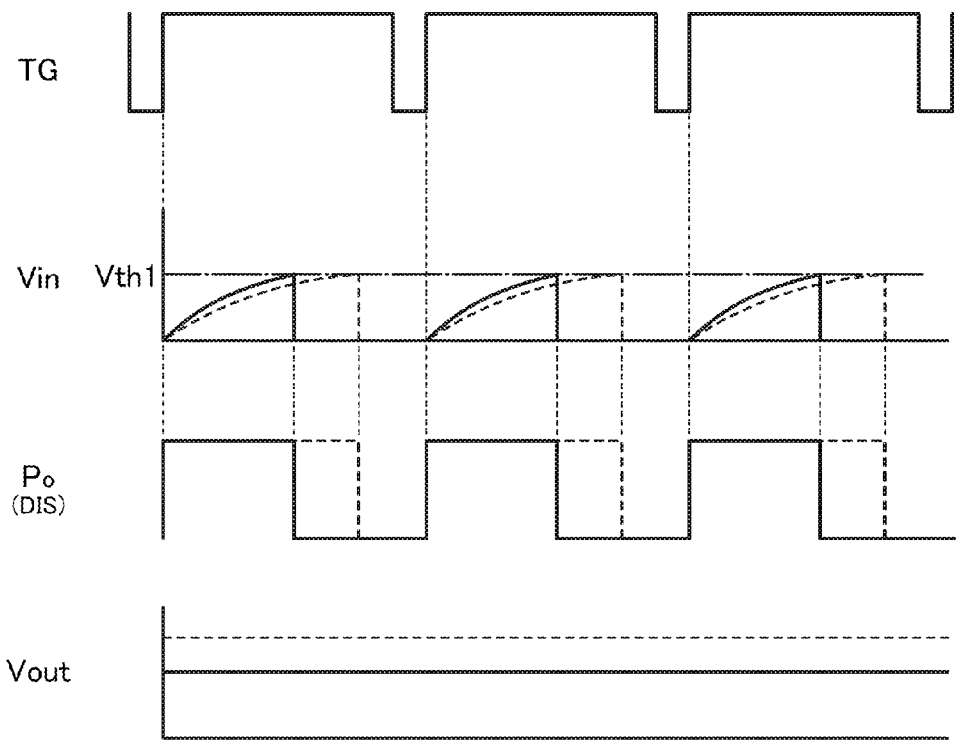
FIG. 5 is an operation waveform charts showing examples of operation waveforms of a detecting circuit of the distance measuring device.

The comparator 202 compares such a trigger signal TG as shown in FIG. 5 which is output from the trigger signal generating circuit 101 with a predetermined threshold Vth2 divided by resistors R1, R2, and R3, and outputs a set pulse synchronized with the trigger signal TG. This set pulse sets the Q output of the RS-FF 203.

The Q output as a discharge signal DIS turns off the transistor 205, and electrically charges between the sensing electrode 11 (12 to 15) and the ground (GND) at a speed defined by a time constant set by the to-ground capacitance C of the sensing electrode 11 (12 to 15) and a resistor R4 connected between the input terminal and a power supply line. Accordingly, the potential of an input signal Vin rises at a speed defined by the capacitance C.

When the input signal Vin exceeds a threshold Vth1 defined by the resistors R1, R2, and R3, the output of the comparator 201 is inverted, thereby inverting the output of the RS-FF 203. As a result, the transistor 205 is turned on, and the charges accumulated in the sensing electrode 11 (12 to 15) are discharged through the transistor 205.

Hence, the timer circuit 102 outputs a pulse signal Po which, as shown in FIG. 5, oscillates at a duty ratio that is based on the capacitance C between the sensing electrode 11 (12 to 15) and the head 49a of the human body 49 coming close to the sensing electrode. The LPF 103 outputs a direct-current sensing signal Vout shown in FIG. 5 by smoothing the pulse signal Po. In FIG. 5, a waveform indicated by a solid line and a waveform indicated by a dotted line show that the former has a smaller capacitance than that of the latter, and, for example, the latter represents a condition that an object is coming close.

The drive motor unit 30 includes a motor driving circuit which changes the position of the headrest 43 by controlling an unillustrated drive motor based on a control signal which is based on calculation results of the arithmetic processing circuit 28 which has performed calculations in the detecting circuit 20 of the distance measuring device 10 based on sensing signals Vout from the capacitance sensing circuits 21 to 25. The drive motor unit 30 also includes a drive motor which actually moves the position of the headrest 43 under the control of the motor driving circuit.

In the present example, the drive motor unit 30 adjusts at least the headrest front portion 43c by causing a movement (frontward-rearward movement) of the headrest front portion 43c in the frontward direction or rearward direction of the vehicle based on a measurement result of the distance measuring device 10. That is, by using the electrode-head distance included in the measurement result, the drive motor unit 30 causes a following movement of the headrest front portion 43c such that the headrest front portion 43c comes at a fixed distance from the head 49a.

Specifically, the drive motor is configured to drive the support shaft 43b of the headrest front portion 43c to freely move in the frontward-rearward direction and drive the support shaft 43a of the headrest back portion 43d to freely move in the upward-downward direction and the leftward-rightward direction (i.e., to make an upward-downward/leftward-rightward movement). Hence, the headrest position adjusting device 100 according to the present example can adjust the headrest 43 to an appropriate position for the head 49a by causing not only a frontward-rearward movement of the headrest 43 described above but an upward-downward/leftward-rightward movement thereof.

The headrest position adjusting device 100 configured as described above can perform position adjustment for the headrest 43 based on a measurement result which includes the distance (electrode-head distance) between the head 49a and the headrest 43 (headrest front portion 43c), which is obtained by the sensing electrodes 11 to 15 of the distance measuring device 10 sensing capacitances C with respect to the head 49a and the detecting circuit 20 calculating the difference value, etc. based on these output values.

Figure 6:
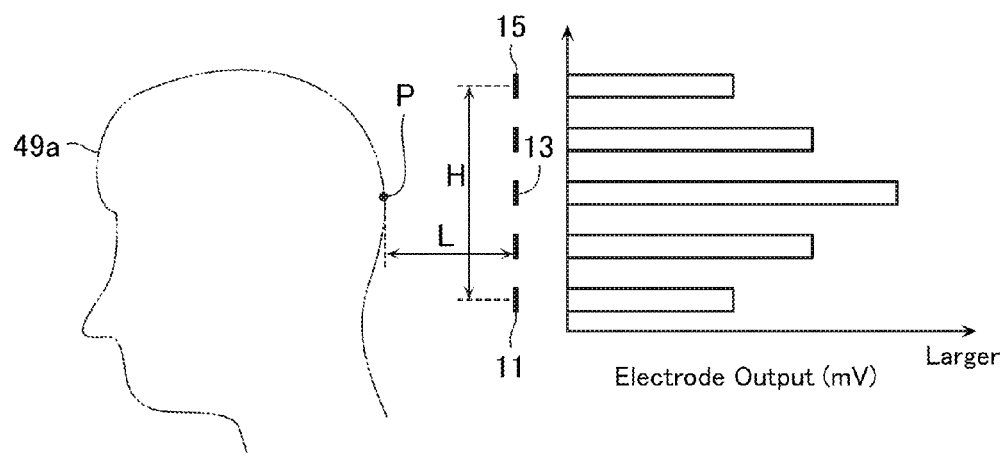
FIG. 6 is an explanatory diagram showing an example of outputs of sensing electrodes of a distance measuring device according to one embodiment of the present invention.
Figure 7A:
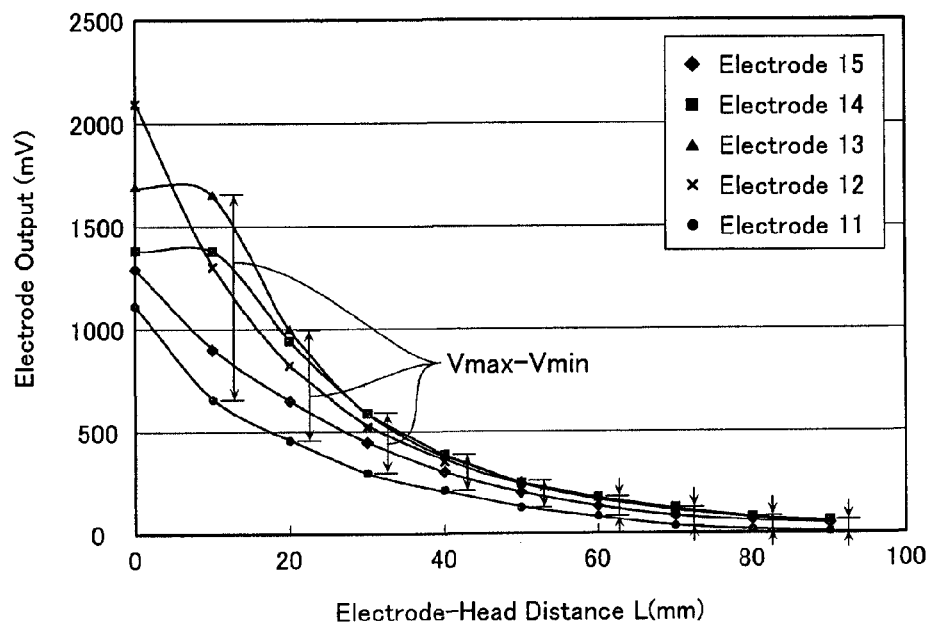
FIG. 7A is an explanatory diagram explaining a relationship between a distance calculation angle and an electrode-head distance according to the distance measuring device.
Figure 7B:
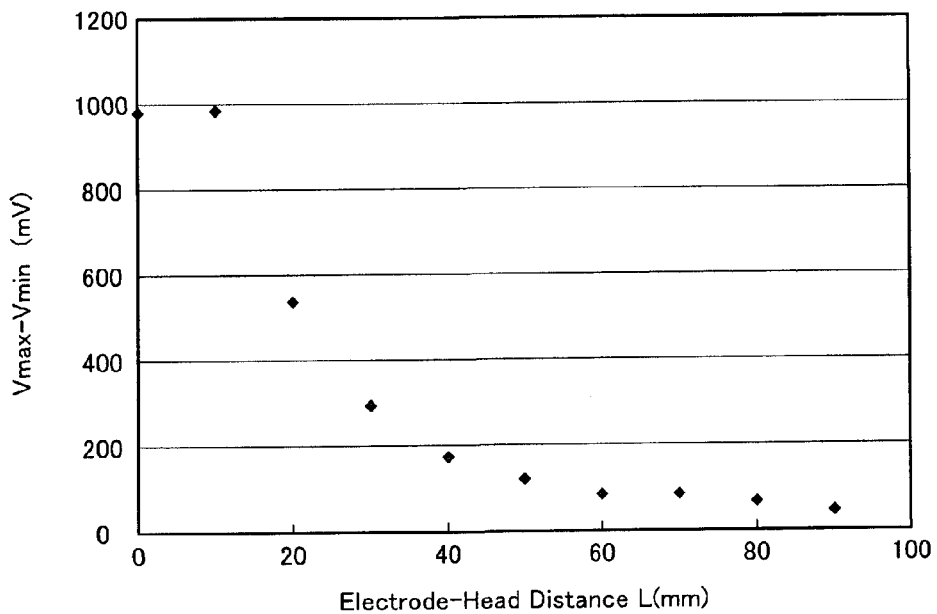
FIG. 7B is an explanatory diagram explaining a relationship between a distance calculation angle and an electrode-head distance according to the distance measuring device.

FIG. 6 is an explanatory diagram showing an example of outputs of the sensing electrodes of the distance measuring device according to one embodiment of the present invention. FIGS. 7A and 7B are diagrams explaining a relationship between the outputs or an amount of change of the outputs and the electrode-head distance according to the distance measuring device. For example, as shown in FIG. 6, when the height-direction center position of the head 49a is defined as P and the electrode-head distance from this center position P, which exists within an electrode-electrode distance H, to each of the sensing electrodes 11 to 15 is defined as L, output values will be as follows.

That is, when the electrode-head distance L is equal to or less than a predetermined range and the vicinity of the side-by-side arrangement direction center of the sensing electrodes 11 to 15 (i.e., the vicinity of the center of the headrest front portion 43c) and the center position P of the head 49a face each other substantially horizontally, the output value (capacitance value) of the sensing electrode 13 is the largest output value among the output values of the sensing electrodes 11 to 15 and the output values (capacitance values) of the sensing electrodes 15 and 11 which are located at the highest position or the lowest position are the smallest output values.

The relationship between the output values of the sensing electrodes 11 to 15 having such output characteristics and the electrode-head distance L is as shown in FIG. 7A. For example, it can be seen from FIG. 7A that the output value of the sensing electrode 13 has the highest rate of increase when the head 49a and the sensing electrode 13 come closer to each other (i.e., the rate of increase of the output value of the sensing electrode 13 changes the most greatly in response to a change of the electrode-head distance L).

Hence, the applicant herein has measured the rate of increase of the output value of each of the sensing electrodes 11 to 15, and found out that a difference value (Vmax−Vmin) obtained by subtracting an output value Vmin having the lowest rate of increase from an output value Vmax having the highest rate of increase had a correlation with the electrode-head distance L (back-set value) as shown in FIG. 7B. That is, it can be said that the greater the electrode-head distance L, the smaller the difference value.

Accordingly, the distance measuring device 10 according to the present example can measure the electrode-head distance L by letting the arithmetic processing circuit 28 of the detecting circuit 20 use the difference value and compare it with such data as shown in FIG. 7B which profiles a relationship between distance and difference value. Then, the headrest position adjusting device 100 including this distance measuring device 10 adjusts the position of the headrest 43 to an appropriate position for the head 49a based on a measurement result obtained by the distance measuring device 10.

Figure 8:
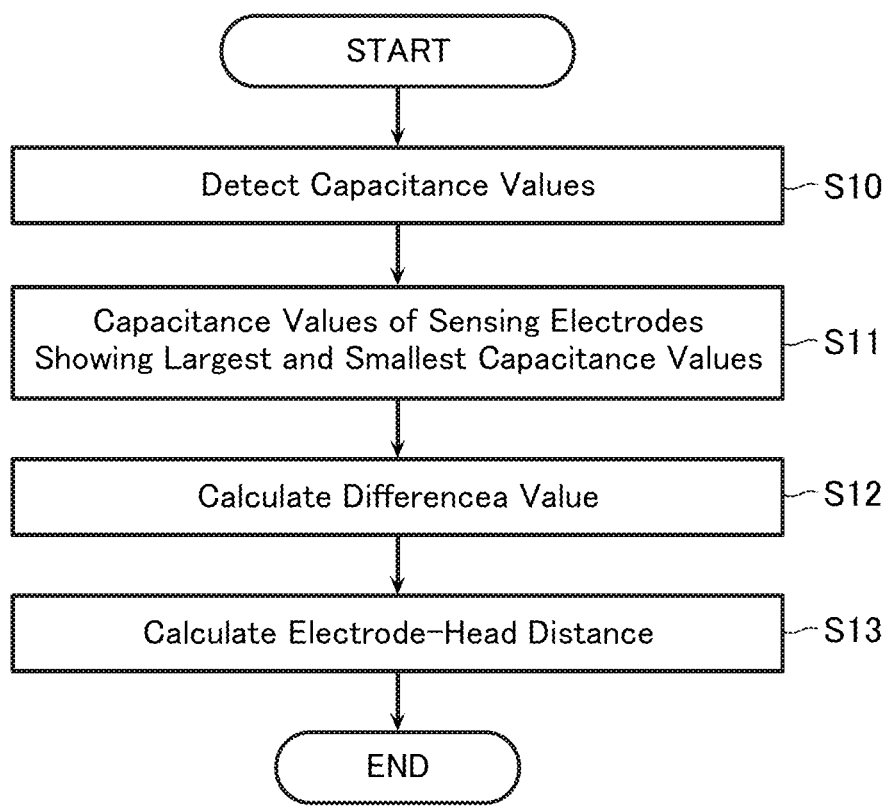
FIG. 8 is a flowchart showing one example of procedures of a distance measuring process by a method for measuring the distance between a headrest and a head according to one embodiment of the present invention.

FIG. 8 is a flowchart showing one example of the procedures of a distance measuring process by a method for measuring the distance between a headrest and a head according to one embodiment of the present invention. As shown in FIG. 8, first, the distance measuring device 10 detects capacitance values which are based on capacitances sensed by the sensing electrodes 11 to 15 with respect to the head 49a (step S10).

Next, based on the detected capacitance values, the distance measuring device 10 extracts the capacitance values of the sensing electrodes which show the largest and smallest capacitances among the sensing electrodes 11 to 15 (step S11), calculates the difference value between the extracted capacitance values (step S12), and calculates the electrode-head distance L by, for example, comparing the calculated difference value with the data profiling a relationship between distance and difference value (step S14), thereby to measure the actual distance between the headrest 43 and the head 49a.

Figure 9:
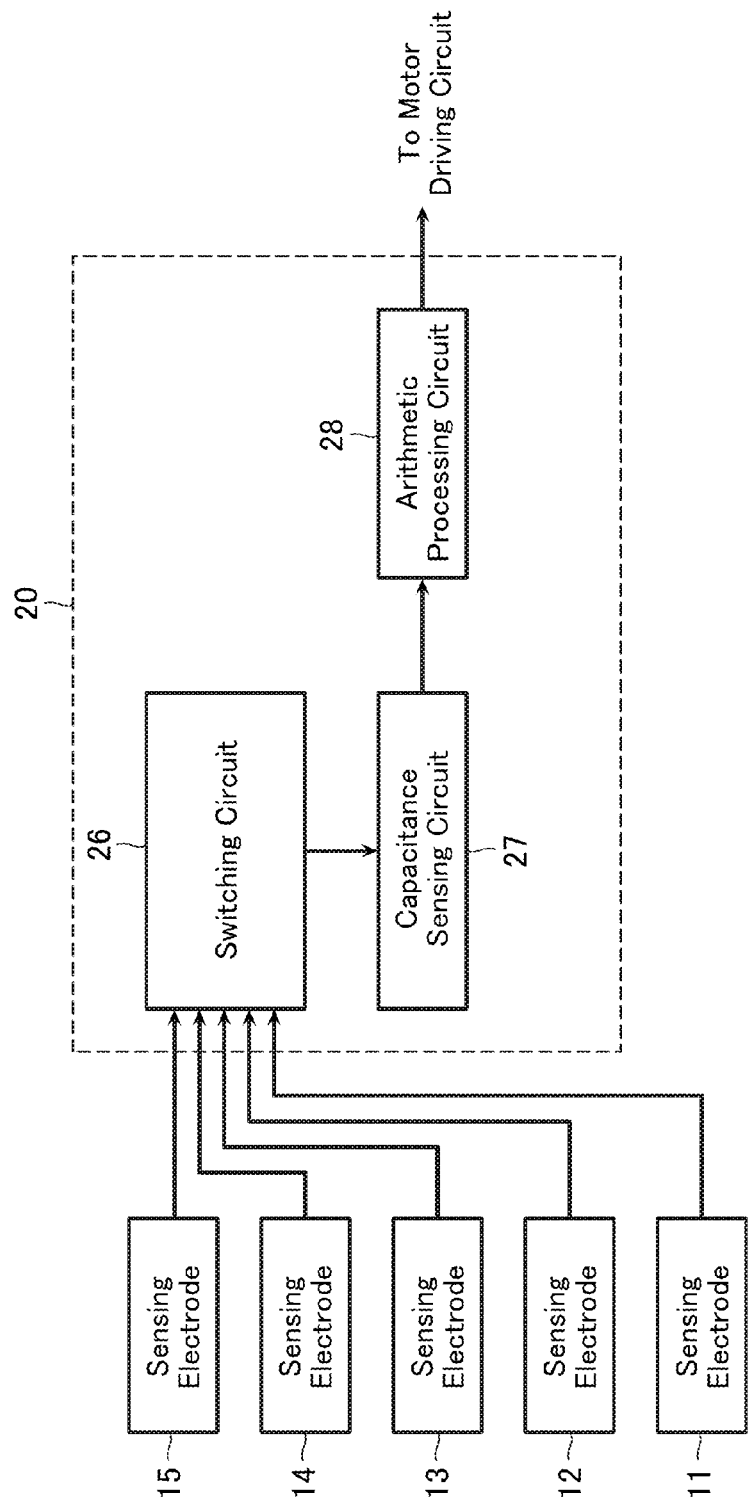
FIG. 9 is a block diagram showing another example of the whole configuration of a device for measuring the distance between a headrest and a head according to one embodiment of the present invention.

FIG. 9 is a block diagram showing another example of the whole configuration of a device for measuring the distance between a headrest and a head according to one embodiment of the present invention. In the following description, any portions that are the same as those already explained will be denoted by the same reference numerals and explanation thereof will not be provided. As shown in FIG. 9, the detecting circuit 20 includes a switching circuit 26 connected to the sensing electrodes 11 to 15, a capacitance sensing circuit 27 which outputs information indicating a capacitance sensed by any of the sensing electrodes 11 to 15 which are to be connected to the capacitance sensing circuit 27 intertemporally through the switching circuit 26, and an arithmetic processing circuit 28 which calculates the difference value, the electrode-head distance L, etc. based on the information output by the capacitance sensing circuit 27 and outputs information indicating the calculation results to the motor driving circuit of the drive motor unit 30.

This configuration of the detecting circuit 20 allows the distance measuring device 10 to be configured with a minimum number of capacitance sensing circuits, and enables the electrode-head distance L to be obtained by calculating the above-described difference value based on a result of sequentially scanning the capacitances of the respective sensing electrodes 11 to 15 which are switched among them by the switching circuit 26.

Figure 10:
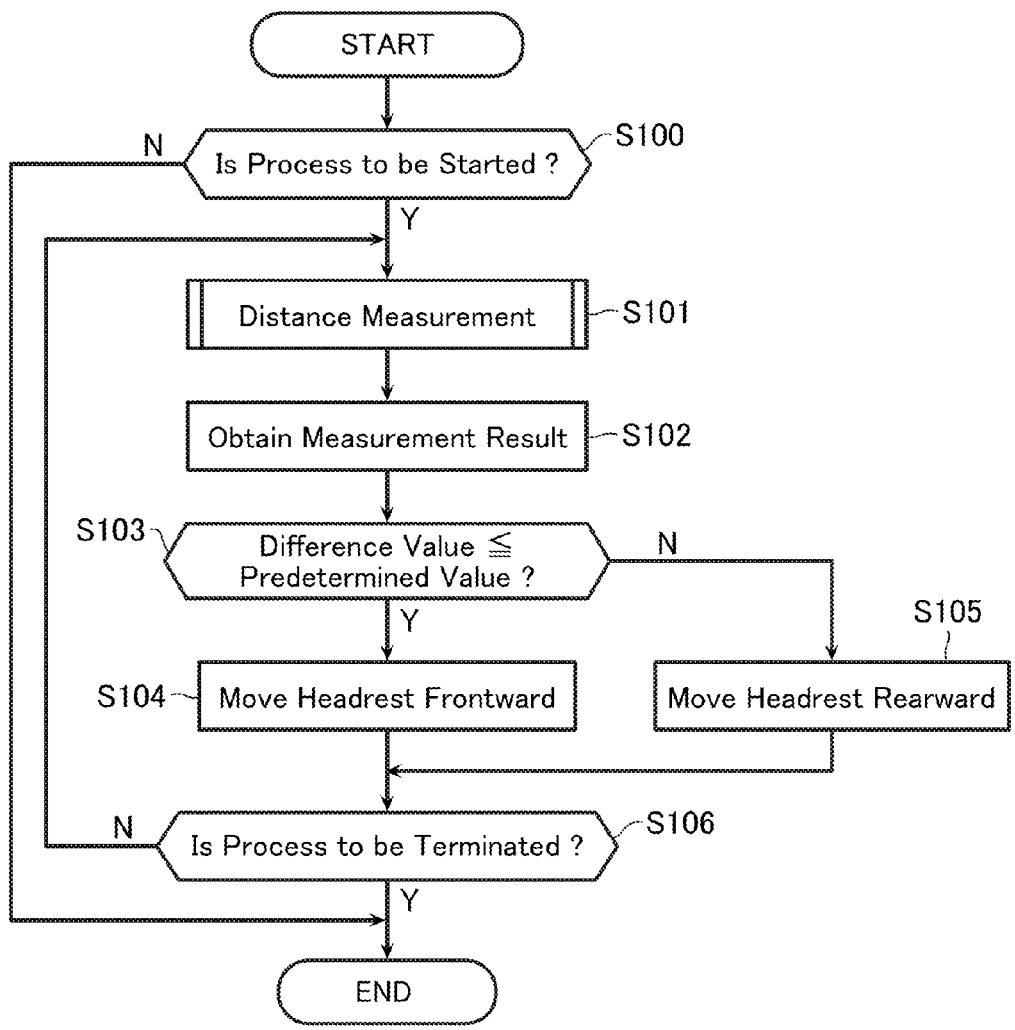
FIG. 10 is a flowchart showing an example of procedures of a position adjusting process by a headrest position adjusting method according to one embodiment of the present invention.

FIG. 10 is a flowchart showing an example of the procedures of a position adjusting process by a headrest position adjusting method according to one embodiment of the present invention. Because the headrest position adjusting device 100 described above includes the distance measuring device 10 as part of its configuration, the arithmetic processing circuit 28 of the detecting circuit 20 has a function as a control unit for controlling the entire headrest position adjusting device 100 and a function as distance measuring means and position adjusting means. Here, a position adjusting process for adjusting the headrest 43 in the frontward-rearward direction will be explained.

As shown in FIG. 10, first, the headrest position adjusting device 100 judges whether or not the process is to be started as triggered by, for example, an ignition switch of the vehicle being turned to an accessory state or an ON state (step S100). When it is judged that the process is not to be started (step S100; N), the headrest position adjusting device 100 terminates the series of position adjusting process according to this flowchart.

When it is judged that the process is to be started (step S100; Y), the headrest position adjusting device 100 lets the distance measuring device 10 perform the distance measuring process described above (step S101), and obtains the measurement result (step S102). Then, the headrest position adjusting device 100 judges whether or not the difference value included in the measurement result is equal to or smaller than, for example, a predetermined value shown in the above-described data profiling a relationship between distance and difference value (step S103). Note that the predetermined value may be preset to a value which defines a distance that is the most preferable as the electrode-head distance L (i.e., the optimum distance to the head 49a).

When it is judged that the difference value is equal to or smaller than the predetermined value (step S103; Y), the headrest position adjusting device 100 calculates the difference between the electrode-head distance L defined by the difference value and the distance defined by the predetermined value, and controls the drive motor unit 30 to move the headrest front portion 43c frontward by an amount of the calculated difference (step S104). When it is judged that the difference value is larger than the predetermined value (step S103; N), the headrest position adjusting device 100 calculates the difference likewise, and moves the headrest front portion 43c rearward by an amount of the calculated difference (step S105).

After the headrest front portion 43c is moved, the headrest position adjusting device 100 judges whether or not the process is to be terminated by, for example, the ignition switch of the vehicle being turned OFF (step S106), and when it is judged that the process is to be terminated (step S106; Y), terminates the series of position adjusting process according to the present flowchart. When it is judged that the process is not to be terminated (step S106; N), the headrest position adjusting device 100 goes to step S101 described above and repeats the subsequent process.

By performing the position adjusting process in this way, it is possible to perform position adjustment by using the measurement result obtained by the distance measuring device 10 and causing a frontward/rearward following movement of the headrest front portion 43c with respect to the position of the head 49a. At step S103 described above, comparison is made between the difference value and the predetermined value. However, for example, comparison may be made between the electrode-head distance L determined by the difference value and the optimum distance described above to go on to step S104 or step S105 described above.

Figure 11:
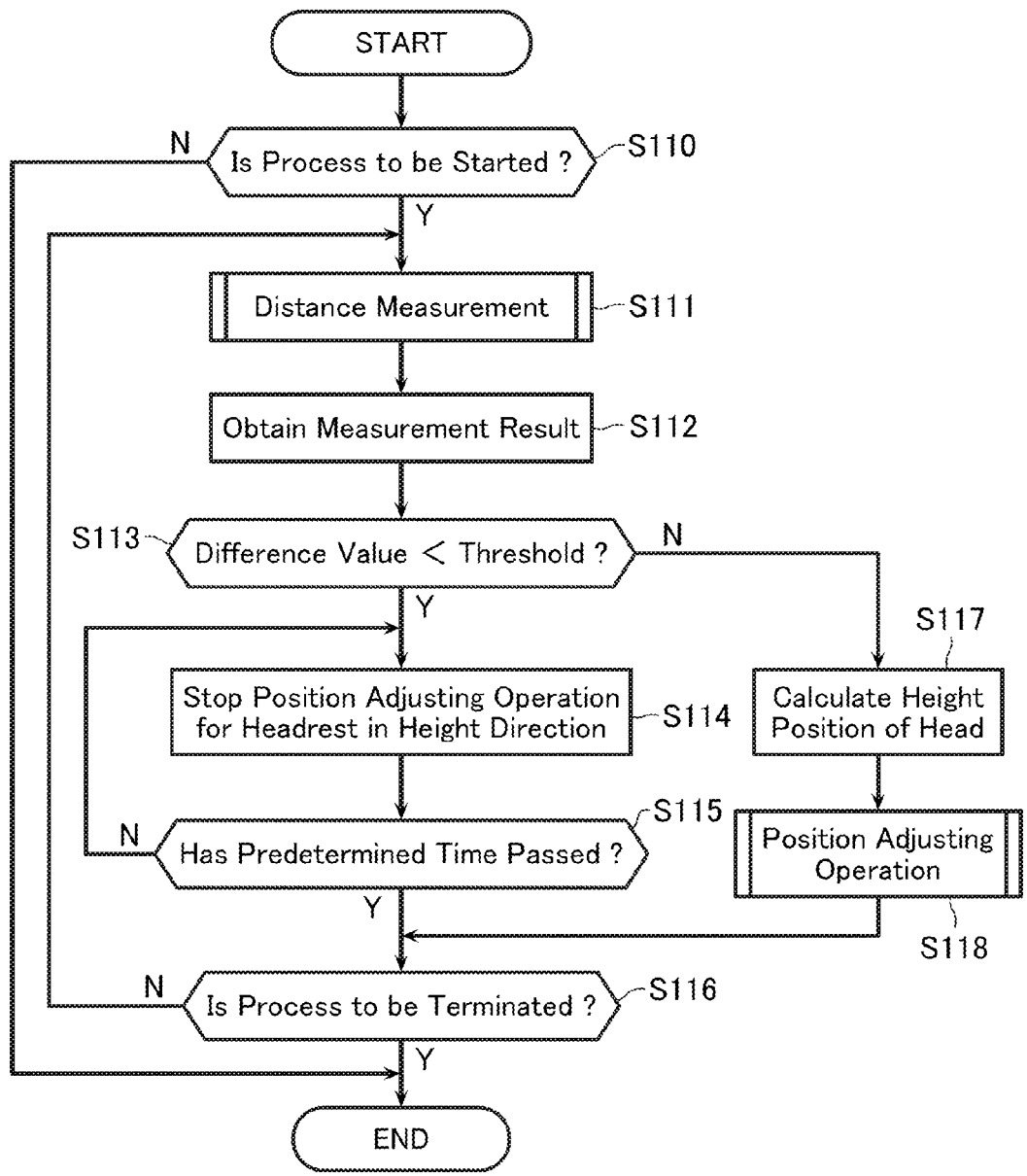
FIG. 11 is a flowchart explaining another example of procedures of a position adjusting process by a headrest position adjusting method according to one embodiment of the present invention.

FIG. 11 is a flowchart showing another example of the procedures of a position adjusting process by a headrest position adjusting method according to one embodiment of the present invention. Here, a position adjusting process for adjusting the headrest 43 in the upward-downward direction will be explained. The process from step S110 to step S112 of the present flowchart is the same as the process from step S100 to step S102 described above, and hence explanation thereof will not be provided.

As shown in FIG. 11, the headrest position adjusting device 100 judges whether or not the difference value included in the measurement result is smaller than a predetermined threshold (for example, a predetermined value shown in the above-described data profiling a relationship between distance and difference value) (step S113). When it is judged that the difference value is smaller than the predetermined threshold (step S113; Y), which means that it is possible to judge that the electrode-head distance L is greater than a predetermined range, the headrest position adjusting device 100 stops the position adjusting operation for the headrest back portion 43d in the height direction (step S114) and waits until a predetermined time passes (step S115; N).

On the other hand, when it is judged that the difference value is equal to or larger than the predetermined threshold (step S113; N), which means that it is possible to judge that the electrode-head distance L is equal to or less than the predetermined range, the headrest position adjusting device 100 calculates the height position of the head 49a by using the capacitance values included in the measurement result (step S117), and performs the position adjusting operation for the headrest back portion 43d in the height direction (step S118).

Note that at step S117, the headrest position adjusting device 100 calculates the height position of the head 49a based on the capacitance values included in the measurement result obtained by all of the sensing electrodes 11 to 15 of the distance measuring device 10. For example, the headrest position adjusting device 100 calculates a position that is estimated to be the height-direction center of the head 49a (an estimated center position) by comparing these capacitance values, and calculates the height position of the head 49a based on this estimated center position.

When the predetermined time has passed (step S115; Y) or when the position adjusting operation has been completed (step S118), the headrest position adjusting device 100 judges whether or not the process is to be terminated (step S116), and when it is judged that the process is to be terminated (step S116; Y), terminates the series of position adjusting process according to the present flowchart. When it is judged that the process is not to be terminated (step S116; N), the headrest position adjusting device 100 goes to step S111 described above and repeats the subsequent process.

By performing the position adjusting process in this way, it is possible to perform position adjustment by using the measurement result obtained by the distance measuring device 10 and moving the headrest back portion 43d in the upward-downward direction. When the electrode-head distance L is greater than the predetermined range (i.e., when the electrodes are distanced from the head 49a), the position adjusting process stops the height-direction position adjusting operation for the headrest back portion 43d. This makes it possible to prevent an unnecessary movement of the headrest 43, avoid giving discomfort to the occupant (vehicle occupant) as much as possible, and suppress unnecessary power consumption.

Figure 12:
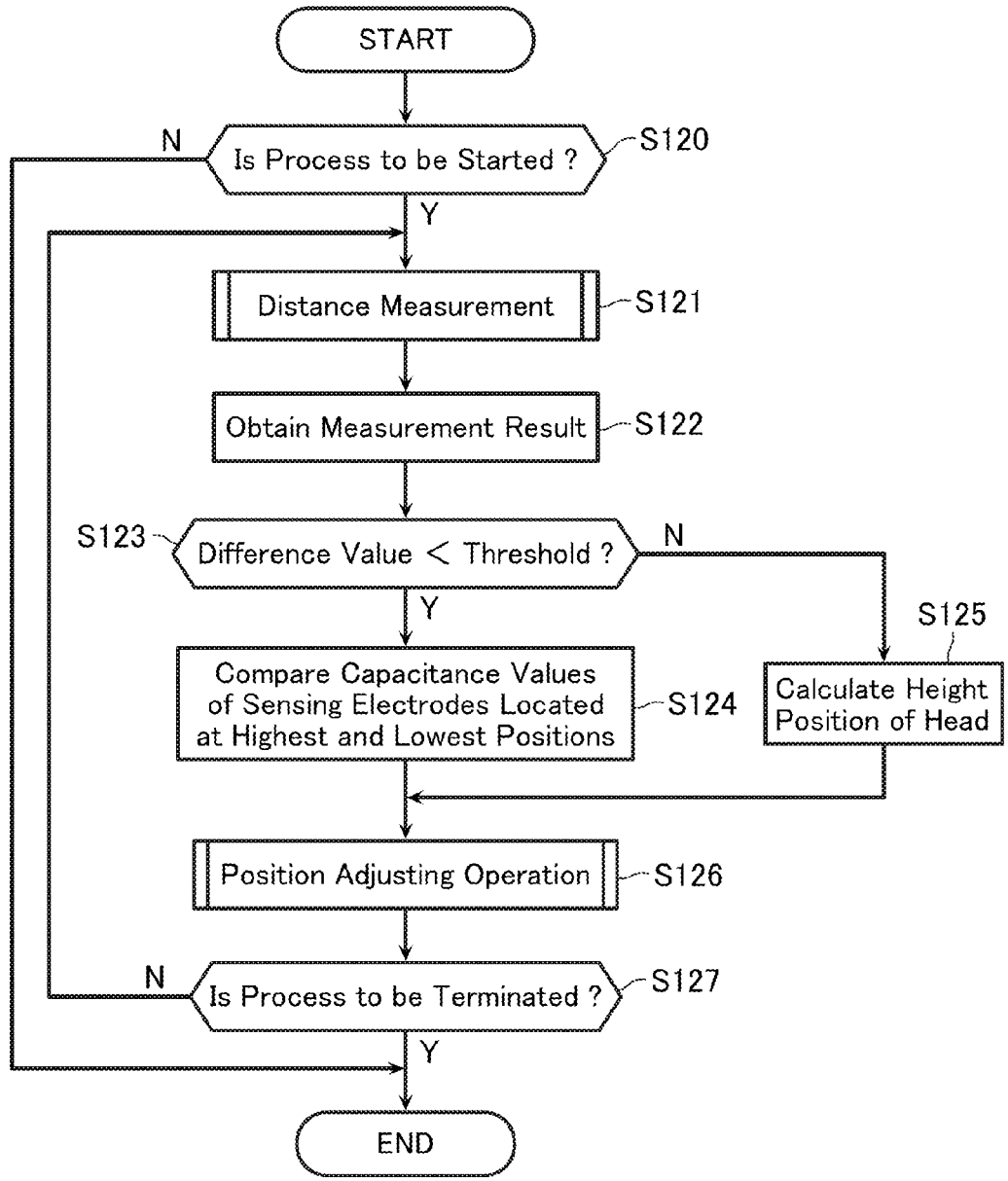
FIG. 12 is a flowchart showing still another example of procedures of a position adjusting process by a headrest position adjusting method according to one embodiment of the present invention.

FIG. 12 is a flowchart showing still another example of the procedures of a position adjusting process by a headrest position adjusting method according to one embodiment of the present invention. The process from step S120 to step S123 of the present flowchart is the same as the process from step S110 to step S113 described above, and hence explanation thereof will not be provided.

As shown in FIG. 12, when it is judged that the difference value included in the measurement result is smaller than a predetermined threshold (for example, a predetermined value shown in the above-described data profiling a relationship between distance and difference value) (step S123; Y), the headrest position adjusting device 100 can judge that the electrode-head distance L is greater than a predetermined range.

Hence, the headrest position adjusting device 100 compares the capacitance value of the sensing electrode located at the highest position (for example, the sensing electrode 15) and the capacitance value of the sensing electrode located at the lowest position (for example, the sensing electrode 11) based on the measurement result (step S124) to calculate the height position of the head 49a. On the other hand, when it is judged that the difference value is equal to or larger than the predetermined threshold (step S123; N), the headrest position adjusting device 100 can judge that the electrode-head distance L is equal to or less than the predetermined range.

Hence, the headrest position adjusting device 100 compares the capacitance values of all of the sensing electrodes 11 to 15 based on the measurement result to calculate the height position of the head 49a (step S125). After this, the headrest position adjusting device 100 performs a height-direction position adjusting operation for the headrest back portion 43d based on the calculation result of step S124 or step S125 (step S126).

When the position adjusting operation has been completed, the headrest position adjusting device 100 judges whether or not the process is to be terminated (step S127). The headrest position adjusting device 100 terminates the series of position adjusting process according to the present flowchart when it is judged that the process is to be terminated (step S127; Y), or goes to step S121 described above and repeats the subsequent process when it is judged that the process is not to be terminated (step S127; N).

Here, comparison among the capacitance values of the sensing electrodes 11 to 15 which are included in the measurement result results in obtaining a capacitance change amount $\Delta C$ which is based on the outputs of the sensing electrodes 11 to 15. This capacitance change amount $\Delta C$ becomes unsuitable as the information for obtaining the height position of the head 49a when the electrode-head distance L becomes greater than a predetermined range, because in this case, there are only insignificant differences among the outputs, making it difficult to perform position adjustment.

Figure 13A:
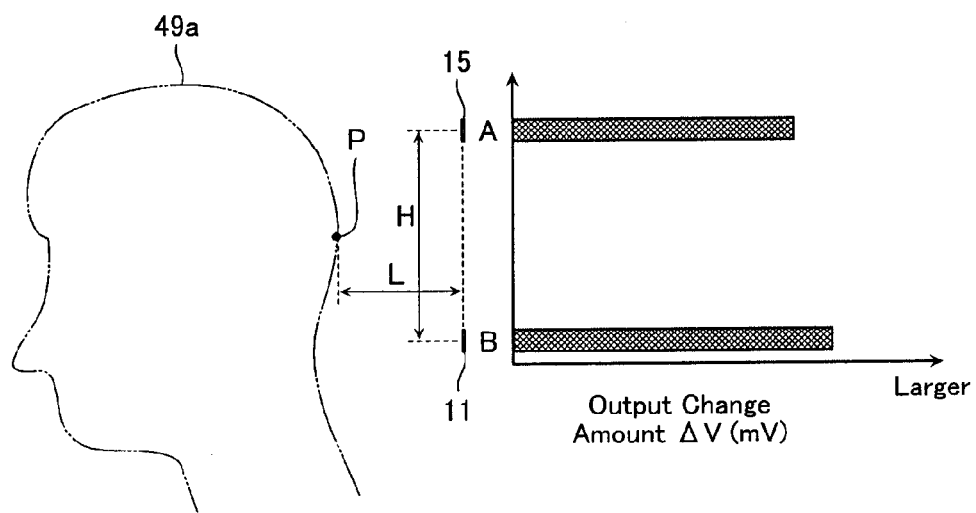
FIG. 13A is an explanatory diagram showing an example of outputs of sensing electrodes of a headrest position adjusting device according to one embodiment of the present invention.
Figure 13B:
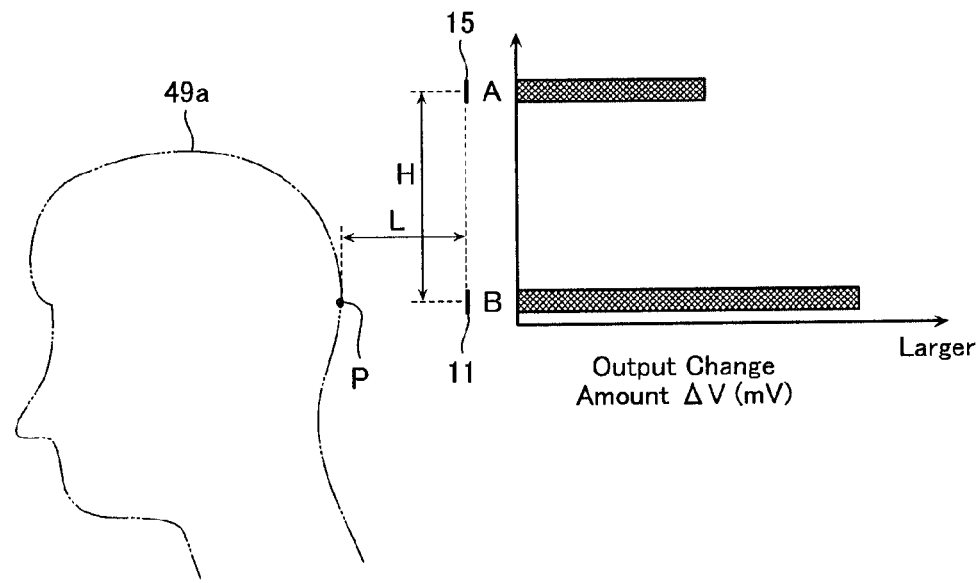
FIG. 13B is an explanatory diagram showing an example of outputs of sensing electrodes of a headrest position adjusting device according to one embodiment of the present invention.

However, comparison between the capacitance value of the sensing electrode 15 located at the highest position and the capacitance value of the sensing electrode 11 located at the lowest position results as follows. That is, even when the electrode-head distance L is greater than the predetermined range, an output change amount $\Delta V$ (mV) based on the outputs A and B of the sensing electrodes 15 and 11 shows that the difference between the outputs is insignificant when the height of the center position P of the head 49a is substantially equal to the height of the center of the headrest 43 as shown in FIG. 13A, but that the difference is significant otherwise as shown in FIG. 13B.

Figure 14:
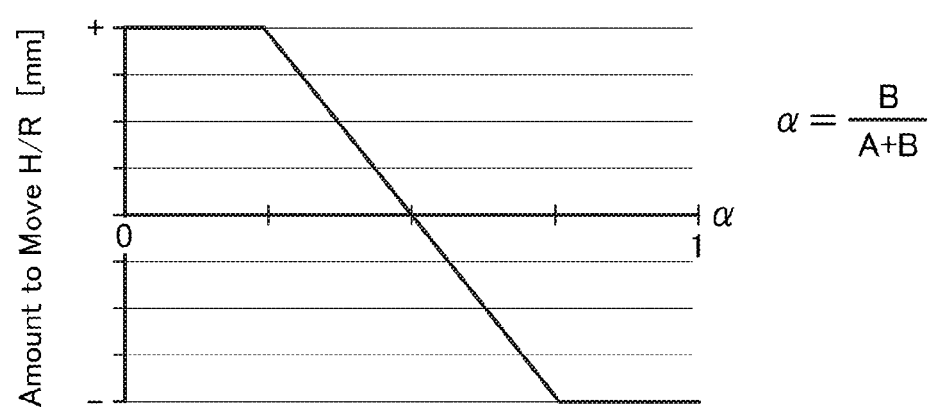
FIG. 14 is an explanatory diagram explaining a relationship between an amount of movement of a headrest and a ratio of an amount of change of output according to the headrest position adjusting device.

Based on the output change amount $\Delta V$ obtained in this way, an output ratio $\alpha$ between the output B of the sensing electrode 11 and the output A of the sensing electrode 15 can be obtained as α=B/(A+B) as shown in FIG. 14. An amount (mm) to move the headrest (H/R) can be calculated based on the obtained output ratio α.

Accordingly, given that the amount to move the headrest when the height of the center position P of the head 49*a* is horizontally equal to the height of the center of the headrest 43 is 0 mm, a control signal is output to the drive motor unit 30 to move the headrest back portion 43*d* upward (in a "+" direction) when the output ratio α is close to 0, or to move the headrest back portion 43*d* downward (in a "−" direction) when the output ratio α is close to 1.

In this way, the headrest position adjusting device 100 according to the present example can obtain the position of the head 49*a* through the step S124 described above based on the capacitance values of the sensing electrodes 15 and 11 located at the highest and lowest positions when the difference value is smaller than the predetermined threshold and hence the electrode-head distance L is greater than the predetermined range, or through step S125 described above based on the capacitance values of the sensing electrodes 11 to 15 when the difference value is equal to or larger than the predetermined threshold and hence the electrode-head distance L is equal to or less than the predetermined range. Therefore, the headrest position adjusting device 100 can adjust the position of the headrest 43 highly accurately with a simple configuration, and can prevent accidents due to failure to adjust the position of the headrest 43, such as cervical spine injury of the human body 49 in a car crash, etc.

At step S113 and step S123 described above, comparison is made between the difference value and the predetermined threshold. However, for example, comparison may be made between the electrode-head distance L determined by the difference value and the optimum distance described above to perform the subsequent process.

The above-described embodiment has explained that position adjustment is performed by moving the headrest front portion 43*c* or the headrest back portion 43*d* in the frontward-rearward direction or in the upward-downward direction through the position adjusting processes shown in FIGS. 10 to 12. However, position adjustment may be performed by, for example, executing these processes in parallel based on the measurement result obtained from the distance measuring device 10, such that the position of the headrest 43 may be adjusted to a position that is appropriate for the head 49*a* in all of the frontward-rearward, upward-downward, and leftward-rightward directions.

The distance measuring device 10 may measure the electrode-head distance L by letting the arithmetic processing circuit 28 select, based on the sensing electrode from which the largest output value is measured when capacitance values are measured from the sensing electrodes 11 to 15, a preset output curve of this sensing electrode.

Further, for example, the distance measuring device 10 may measure the electrode-head distance L by using a difference value calculated by subtracting the capacitance value of the sensing electrode having the smallest output value from the capacitance value of a reference sensing electrode (e.g., the sensing electrode 13) that is located at the middle position between the highest position and lowest position of the headrest front portion 43*c*.

DESCRIPTION OF REFERENCE NUMERALS

10 distance measuring device
11 to 15 sensing electrode
19 substrate
20 detecting circuit
21 to 25 capacitance sensing circuit
26 switching circuit
27 capacitance sensing circuit
28 arithmetic processing circuit
29 harness
30 drive motor unit
40 seat
41 backrest (seat back)
42 sitting portion
43 headrest
43*a* support shaft
43*b* support shaft
43*c* headrest front portion
43*d* headrest back portion
49 human body
49*a* head
100 headrest position adjusting device

The invention claimed is:

1. A device for measuring a distance between a headrest and a head, comprising:
   a plurality of sensing electrodes which are provided in a headrest provided on a seat of a vehicle for sensing capacitances between a head of a human body sitting on the seat and the headrest, the sensing electrodes being provided side by side along a height direction of the headrest;
   a detecting circuit which detects capacitance values which are based on the capacitances from the plurality of sensing electrodes; and
   distance measuring means which measures an electrode-head distance indicating a distance between the headrest and the head, in accordance with detection results detected by the detecting circuit,
   wherein the distance measuring means obtains a plurality of capacitance values each sensed by corresponding one of the sensing electrodes, among the obtained plurality of capacitance values, determines the highest capacitance value and the lowest capacitance value, calculates a difference value between the highest capacitance value and the lowest capacitance value, and determines the electrode-head distance between the headrest and the head using the calculated difference value.

2. The device for measuring a distance between a headrest and a head according to claim 1,
   wherein the distance measuring means measures the electrode-head distance by comparing the difference value with preset data which profiles a relationship between distance and difference value.

3. The device for measuring a distance between a headrest and a head according to claim 1,
   wherein the plurality of sensing electrodes are provided in the headrest at a portion closer to a front surface of the headrest and formed in a rectangular strip shape having its longer dimension extend in a width direction perpendicular to the height direction, and
   the detecting circuit includes a plurality of capacitance sensing circuits which are connected one-to-one to the plurality of sensing electrodes, and output the capacitance values which are based on the capacitances sensed by the sensing electrodes.

4. The device for measuring a distance between a headrest and a head according to claim 1,
   wherein the plurality of sensing electrodes are provided in the headrest at a portion closer to a front surface of the headrest and formed in a rectangular strip shape having its longer dimension extend in a width direction perpendicular to the height direction, and the detecting circuit includes a switching circuit connected to the plurality of sensing electrodes such that a connection between the switching circuit and the plurality of sensing electrodes is switched by the switching circuit, and a capacitance sensing circuit which outputs the capacitance value which is based on the capacitance sensed by any of the sensing electrodes which are to be connected to the capacitance sensing circuit at a different time from other sensing electrode through the switching circuit.

5. A headrest position adjusting device, comprising:
the device for measuring a distance between a headrest and a head according to claim 1; and
position adjusting means which adjusts a position of the headrest to an appropriate position for the head based on a measurement result from the device for measuring a distance.

6. The headrest position adjusting device according to claim 5,
wherein the position adjusting means adjusts the position of the headrest by moving the headrest in a frontward direction or rearward direction of the vehicle based on the difference value which is included in the measurement result, such that the difference value becomes a predetermined value.

7. The headrest position adjusting device according to claim 5,
wherein the position adjusting means compares the difference value included in the measurement result with a predetermined threshold, and when the difference value is smaller than the predetermined threshold, stops a position adjusting operation for the headrest at least in the height direction.

8. The headrest position adjusting device according to claim 7,
wherein when the position adjusting means stops the position adjusting operation for the headrest for a predetermined time, after the predetermined time passes, the position adjusting means again compares the difference value with the predetermined threshold.

9. The headrest position adjusting device according to claim 5,
wherein when the difference value included in the measurement result is smaller than a predetermined threshold, the position adjusting means adjusts the position of the headrest by moving the headrest in an upward direction or downward direction of the vehicle by using the capacitance values which are detected by the detecting circuit based on the capacitances from at least the sensing electrode located at a highest position of the headrest among the plurality of sensing electrodes and the sensing electrode located at a lowest position of the headrest among the plurality of sensing electrodes.

10. The headrest position adjusting device according to claim 5,
wherein when the difference value included in the measurement result is equal to or larger than a predetermined threshold, the position adjusting means calculates an appropriate position of the head with respect to the headrest by using the capacitance values which are detected by the detecting circuit based on the capacitances from the plurality of sensing electrodes, and adjusts the position of the headrest to the appropriate position.

11. A method for measuring a distance between a headrest and a head, comprising:
a sensing step of sensing capacitances between a head of a human body sitting on a seat of a vehicle and a headrest provided on the seat by means of a plurality of sensing electrodes which are provided in the headrest side by side along a height direction of the headrest;
a detecting step of detecting capacitance values which are based on the capacitances sensed in the sensing step; and
a distance measuring step of measuring an electrode-head distance indicating a distance between the headrest and the head, in accordance with detection results detected in the detecting step,
wherein the distance measuring step obtains a plurality of capacitance values each sensed by corresponding one of the sensing electrodes, among the obtained plurality of capacitance values, determines the highest capacitance value and the lowest capacitance value, calculates a difference value between the highest capacitance value and the lowest capacitance value, and determines the electrode-head distance between the headrest and the head using the calculated difference value.

12. The method for measuring a distance between a headrest and a head according to claim 11,
wherein the distance measuring step measures the electrode-head distance by comparing the difference value with preset data which profiles a relationship between distance and difference value.

13. A headrest position adjusting method, comprising:
the method for measuring a distance between a headrest and a head according to claim 11; and
a position adjusting step of adjusting a position of the headrest to an appropriate position for the head based on a measurement result measured by the method for measuring a distance.

14. The headrest position adjusting method according to claim 13,
wherein the position adjusting step adjusts the position of the headrest by moving the headrest in a frontward direction or rearward direction of the vehicle based on the difference value which is included in the measurement result, such that the difference value becomes a predetermined value.

15. The headrest position adjusting method according to claim 13,
wherein the position adjusting step compares the difference value included in the measurement result with a predetermined threshold, and when the difference value is smaller than the predetermined threshold, stops a position adjusting operation for the headrest at least in the height direction.

16. The headrest position adjusting method according to claim 15,
wherein when the position adjusting step stops the position adjusting operation for the headrest for a predetermined time, after the predetermined time passes, the position adjusting step again compares the difference value with the predetermined threshold.

17. The headrest position adjusting method according to claim 13,
wherein when the difference value included in the measurement result is smaller than a predetermined threshold, the position adjusting step adjusts the position of the headrest by moving the headrest in an upward direction or downward direction of the vehicle by using the capacitance values which are detected in the detecting step based on the capacitances from at least the sensing electrode located at a highest position of the headrest among the plurality of sensing electrodes and the sensing electrode located at a lowest position of the headrest among the plurality of sensing electrodes.

18. The headrest position adjusting method according to claim 13,
 wherein when the difference value included in the measurement result is equal to or larger than a predetermined threshold, the position adjusting step calculates an appropriate position of the head with respect to the headrest by using the capacitance values which are detected in the detecting step based on the capacitances from the plurality of sensing electrodes, and adjusts the position of the headrest to the appropriate position.

19. The headrest position adjusting device according to claim 1, wherein the distance measuring means determines the electrode-head distance in accordance with a relationship between the electrode-head distance and the difference value, the relationship being that the greater the electrode-head distance, the smaller the difference value.

20. The headrest position adjusting method according to claim 11, wherein the distance measuring step determines the electrode-head distance in accordance with a relationship between the electrode-head distance and the difference value, the relationship being that the greater the electrode-head distance, the smaller the difference value.

\* \* \* \* \*